No. 617,968. Patented Jan. 17, 1899.
P. OBERST.
CAR LOADING APPARATUS.
(Application filed June 6, 1898.)
(No Model.)
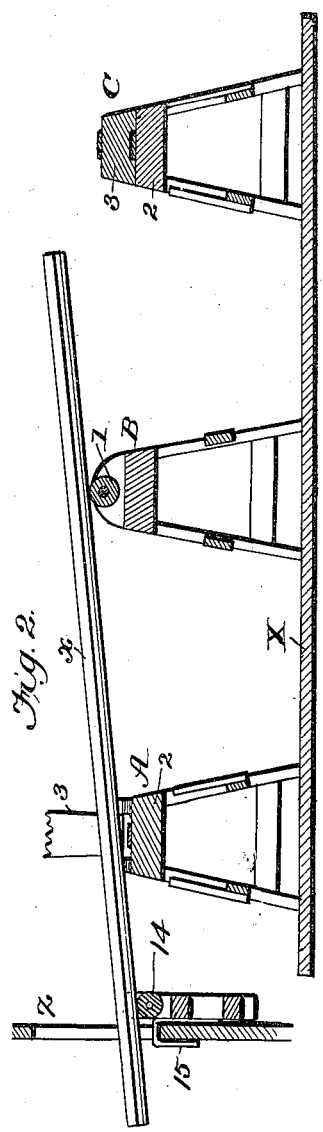
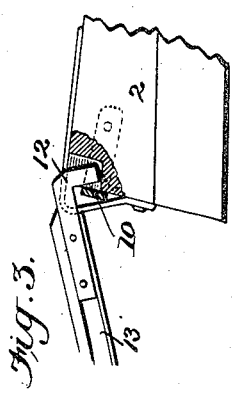
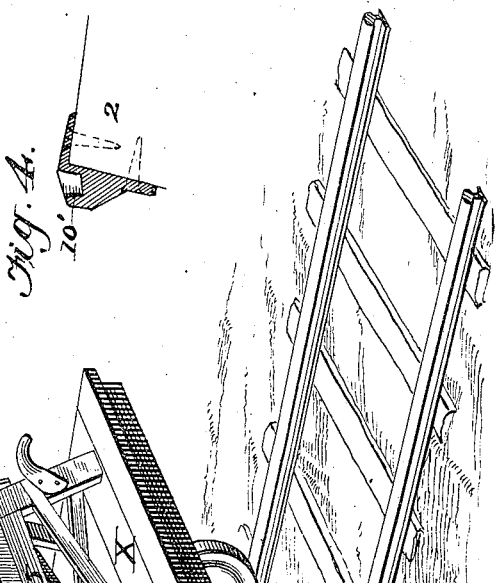
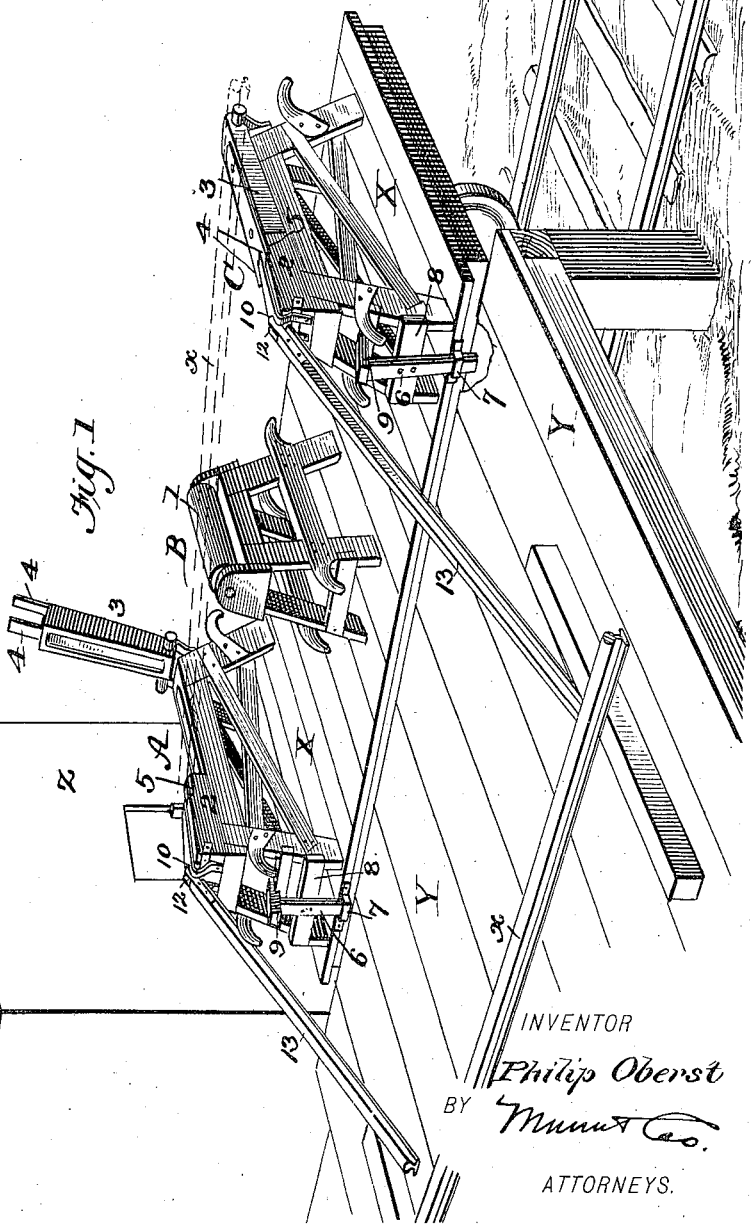
WITNESSES:
Jos. A. Ryan
Amos W Hart
INVENTOR
Philip Oberst
BY
Munn & Co.
ATTORNEYS.

UNITED STATES PATENT OFFICE.

PHILIP OBERST, OF WEST SUPERIOR, WISCONSIN.

CAR-LOADING APPARATUS.

SPECIFICATION forming part of Letters Patent No. 617,968, dated January 17, 1899.

Application filed June 6, 1898. Serial No. 682,703. (No model.)

*To all whom it may concern:*

Be it known that I, PHILIP OBERST, a citizen of the United States, residing at West Superior, in the county of Douglas and State of Wisconsin, have invented a new and useful Improved Car-Loading Apparatus, of which the following is a specification.

It is the object of my invention to provide an improved apparatus for loading railroad-rails, timbers, and logs upon cars. The same includes three "horses" or movable supports, which are adapted for use either upon the ground or upon a platform-car which may be arranged adjacent to one end of the car to be loaded. These horses are distinguished by a peculiar construction and combination of parts, whereby they are adapted to coact in such a manner as to enable the rails, &c., to be loaded with ease and expedition. I also employ in connection with the aforesaid horses a hanging roller, which is adapted to be supported from the window of a box-car.

The construction and operation of parts are as hereinafter described, and illustrated in the accompanying drawings, in which—

Figure 1 is a perspective view illustrating the practical use of my invention. Fig. 2 is a longitudinal section of the apparatus as arranged and operated in actual use. Fig. 3 is an enlarged detail view, partly in section, showing the connection of a skid with one of the horses. Fig. 4 shows a modification.

As shown in Figs. 1 and 2, the three horses or movable supports A B C are arranged parallel upon a platform-car X. The horses A C are similar in construction and are arranged equidistantly from the horse B, which is located between them. The latter consists of a four-leg support or frame having a top roller 1, which is arranged parallel to the top bar of the horse proper, as shown best in Fig. 1. The horses A C are distinguished by the following features of construction: The top portion is formed of a fixed section 2 and a hinged section 3, which are normally alined, as shown in Fig. 1, so that they form a plain or straight surface. The section 3 is hinged at the outer end of the horse, and its inner end is provided with two tongues 4, which fit in corresponding recesses 5, formed in the adjacent inner end of the fixed section 2. At each end of the horses A C is arranged a pendent arm or leg 6, which is adapted to enter one of the keepers 7, ordinarily applied to the side of a platform-car for holding stakes or other supports for side boards. It will be observed that the said leg 6 is arranged exteriorly to the supporting-legs of the horse and is suitably secured thereto by means of a cross-bar 8 and other bars 9, as shown in Fig. 1. Another characteristic of said horses A C is the provision of a metal socket 10 at the top corner immediately over the pendent arm or leg 6. Said socket is formed of pieces of strap-iron suitably arranged; but in practice I may employ a cast-metal socket 10, as shown in Fig. 4. Said socket 10 is for the purpose of receiving hooks 12, which form attachments of skids 13. The latter are arranged in the usual way, their free ends resting upon the dock or platform Y, alongside which the car X is located.

Another portion of my invention is a hanging roller 14, Fig. 2, which consists of a rectangular frame having hooks 15 on one side and provided with an antifriction-roller at its upper end. The said hooks are adapted to engage the window-sill of a box-car Z, as shown.

From the foregoing description the operation of my invention will be readily understood. Rails $x$, which are to be loaded into the box-car Z, are slid up on the skids 13 until they rest upon the fixed sections 2 of the horses A C. Then the movable section 3 of that horse—say A—which is adjacent to the box-car to be loaded is raised and thrown back, as shown in Fig. 1. The rails are then moved laterally and slid onto the hinged section 3 of, say, horse C and also onto the roller 1 of the intermediate horse B. In such case it is apparent that the rails will be supported solely by the horses B and C and that they may be easily rolled endwise toward the opening or window of the box-car Z, when they will drop by gravity upon the roller 14, hanging from said window, and the endwise motion being continued the rails pass easily into the box-car. It is thus apparent that rails may be loaded into a car arranged at either end of the platform-car X and that in such case the hinged section 3 of that horse which is adjacent to such box-car must be raised, while the hinged section of the other or corresponding one is left in its normal or closed position.

It will be seen that the horses A B C may be located upon the ground and thus effectively used for loading a platform-car. In such case, however, the pendent legs 6 will obviously require to be inserted in a hole formed for the purpose.

Having thus described my invention, what I claim is—

1. A car-loading apparatus having a horse or support having a top section which is hinged and adapted to be thrown back for the purpose of temporarily lessening the height of such support, as shown and described.

2. A car-loading apparatus having a horse or movable support having a fixed top section and a hinged top section which is normally alined with said fixed section and is provided at its inner end with tongues that enter recesses in the fixed section, as shown and described.

3. In a car-loading apparatus, the combination with a car, of three horses or movable supports the middle or intermediate horse having a top roller and the others having pendent legs adapted to enter keepers on the car, and skids having at one end devices for engaging the top end portion of such horses, as and for the purpose specified.

4. The improved car-loading apparatus, having two horses or supports having a movable top section 3, and an adjacent and alined fixed section 2, means for holding said horses fixed in position, and an intermediate horse or support adapted to coöperate as shown and described.

PHILIP OBERST.

Witnesses:
LOUIS HANITCH,
JAMES R. HILE.